Figure 1:
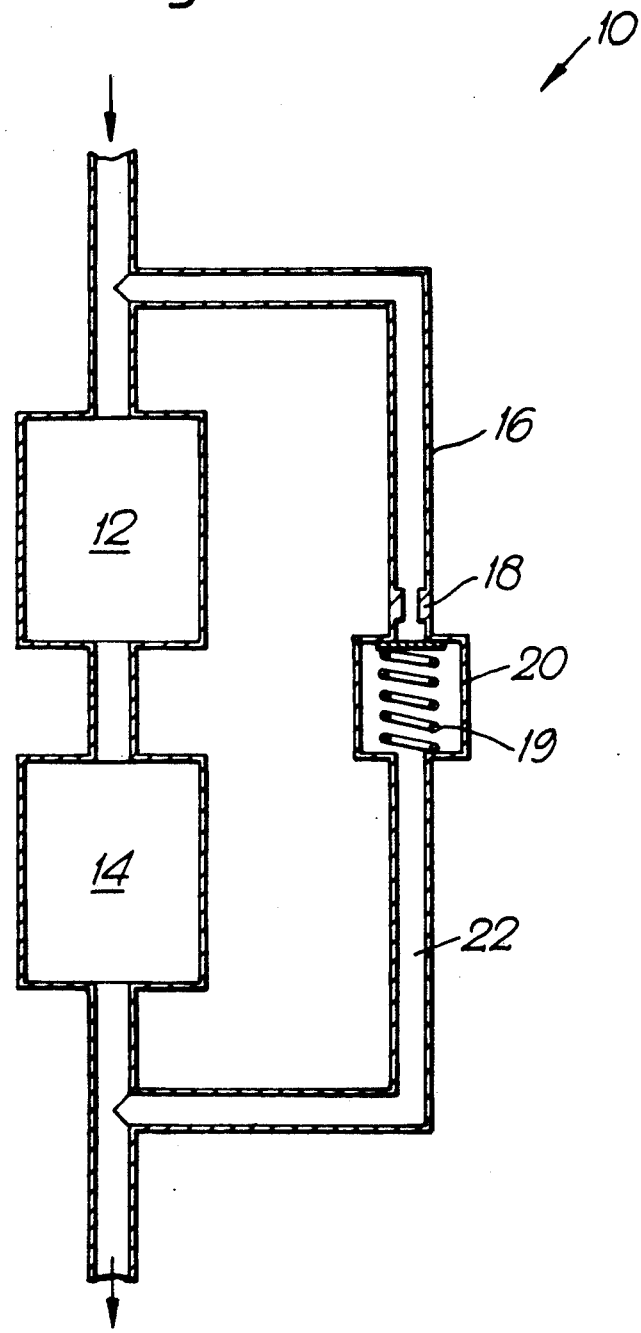

United States Patent
Hardaker

Patent Number: 5,124,052
Date of Patent: Jun. 23, 1992

[54] APPARATUS FOR AND METHOD OF FILTERING A FLUID

[75] Inventor: Edwin J. Hardaker, Glasgow, Scotland

[73] Assignee: Rolls-Royce plc, London, England

[21] Appl. No.: 669,516

[22] Filed: Mar. 14, 1991

[30] Foreign Application Priority Data

Apr. 10, 1990 [GB] United Kingdom ............... 9008140

[51] Int. Cl.$^5$ ............................................. B01D 35/02
[52] U.S. Cl. ................................... 210/774; 210/130; 210/181; 210/416.4; 123/196 A; 123/196 AB
[58] Field of Search ............... 210/132, 175, 181, 184, 210/186, 130, 774; 123/196 R, 196 A, 196 AB

[56] References Cited

U.S. PATENT DOCUMENTS

| | | | |
|---|---|---|---|
| 3,458,414 | 7/1969 | Crane et al. | 210/132 |
| 4,971,704 | 11/1990 | Johnson, Sr. | 210/175 |

FOREIGN PATENT DOCUMENTS 2195144  3/1988  United Kingdom .

Primary Examiner—Robert A. Dawson
Assistant Examiner—W. L. Millard
Attorney, Agent, or Firm—Cushman, Darby & Cushman

[57] ABSTRACT

A fluid filter assembly comprises a heater and a filter in series fluid flow relationship. A means for bypassing a fluid around the heater and the filter is provided which comprises ducts and a relief valve interposed between them. In normal operation the relief valve is closed so all the fluid flows through the heater and the filter. The fluid and any liquid impurities entrained therein are heated by the heater prior to passing through the filter. At low temperatures the heater cannot normally provide sufficient heat to prevent solidification of the liquid impurities entrained within the fluid which block the filter. The relief valve then opens to allow a proportion of fluid to flow through the bypass so a reduced amount of fluid flows through the heater and the filter. The heater heats the reduced flow of fluid therethrough to a temperature sufficiently high to melt the solidified liquid impurities blocking the filter.

6 Claims, 1 Drawing Sheet

APPARATUS FOR AND METHOD OF FILTERING A FLUID

The present invention relates to a fluid filter assembly and to a method of removing impurities entrained within a fluid which solidify to block the filter assembly at low temperatures. In particular the present invention relates to such a fluid filter assembly for use in the fuel system of a gas turbine engine.

The fuel system of a gas turbine aeroengine functions to provide the engine with fuel in a form and quantity required to suit all engine operating conditions. A fuel pump delivers fuel to fuel spray nozzles which inject it into a combustion chamber in the form of an atomised spray. The fuel is supplied to the fuel spray nozzles via a fuel filter which serves to remove particulate impurities from the fuel. By keeping the fuel free from debris undue wear in the engine is prevented and the possibility of blockages occurring within the fuel system is reduced.

In many gas turbine aeroengines a heat exchanger is located between the fuel pump and the inlet to the fuel filter. The heat exchanger acts to transfer heat from a flow of oil to the fuel thereby cooling the oil. By transferring heat to the fuel liquid impurities entrained within the fuel, such as water, are heated with the fuel and pass out through the combustion system. However when using water contaminated fuel at low temperatures the heat transfer from oil to fuel is insufficient to prevent the formation of ice and blockage of the filter by the ice particles can occur. A second heat exchanger may then be used which transfers further heat to the fuel. The incorporation of an additional heat exchanger is however undesirable due to the extra weight and cost incurred. The additional heat exchanger may be an air to fuel heat exchanger which will also result in a loss of engine efficiency as hot compressed air is taken from the engine compressor for this purpose.

The present invention seeks to provide a filtering assembly which eliminates the need to use an additional heat exchanger when water contaminated fuel is used at low temperatures.

According to the present invention, a fluid filter assembly comprises a fluid filter having an inlet and an outlet to permit a flow of fluid therethrough to filter any solid impurities entrained within the fluid, heating means adjacent the inlet of the fluid filter to heat the fluid and any liquid impurities entrained therein prior to passing through the filter, and bypass means for allowing a proportion of the fluid to bypass the heating means and the fluid filter when a predetermined pressure differential exists across the heating means and the fluid filter, whereby in operation the bypass means for allowing a proportion of fluid to bypass the heating means and the fluid filter is normally closed so that all fluid flows through the heating means and the fluid filter, however when the fluid temperature is sufficiently low to cause blockage of fluid filter by solidification of the liquid impurities entrained therein, the bypass means is adapted to open to allow a proportion of fluid to bypass the heating means and the fluid filter when a predetermined pressure differential exits across the heating means, so that a reduced amount of fluid flows through the heating means, the magnitude of the reduction in the flow of fluid through the heating means being such that said fluid is heated to a temperature sufficiently high to melt any solidified impurities blocking the fluid filter.

Preferably the bypass means for allowing a proportion of fluid to bypass the heating means and the filter is a duct incorporating a relief valve. The relief valve may be pressure responsive and the duct may further incorporate a restrictor to limit the amount of fluid which can flow therethrough.

The heating means is preferably a heat exchanger.

A method of melting solidified liquid impurities blocking a fluid filter in a fluid filter assembly, which comprises a heating means and a fluid filter in series fluid flow relationship, comprises the steps of, opening a bypass means associated with said fluid filter assembly to allow a proportion of a fluid to bypass the heating means and the fluid filter so that a reduced amount of fluid flows through the heating means and the fluid filter, heating the reduced amount of fluid flowing through the heating means to a temperature sufficiently high to melt the solidified liquid impurities in the fluid filter, and closing the bypass means so all the fluid flows through the heating means and the fluid filter once the solidified liquid impurities in the fluid filter have melted.

The invention will now be described by way of example and with reference to the accompanying FIGURE in which, FIG. 1 shows a schematic view of a filtering assembly in accordance with the present invention.

Referring to FIG. 1, a fluid filtering assembly generally indicated at 10, comprises a heater 12 and a filter 14 which are in series fluid flow relationship with one another. A bypass means for bypassing a proportion of the fluid around the heater 12 and the filter 14 when a predetermined pressure differential exists across the heater 12 and the filter 14 is provided. The bypass means comprises ducts 16 and 22, and a relief valve 20 interposed between them. The duct 16 includes a restrictor 18 which limits the amount of fluid which flows to the relief valve 20. The relief valve 20 is spring loaded and will allow the passage of fluid from the duct 16 to the duct 22 only when the pressure of the fluid in the duct 16 is sufficient to open the valve against the action of opposing spring 19.

In normal operation the relief valve 20 is closed so that all the fluid flows through the heater 12 and the filter 14. A fluid, such as fuel, is supplied from a fuel pump or other suitable source (not shown) and enters the heater 12 where it is heated. In the arrangement shown the heater 12 is a heat exchanger in which heat is transferred from a fluid such as oil to the fuel thereby cooling the oil. The heated fuel then flows to the filter 14 where any solid impurities entrained in fuel are filtered out. Filtering of the fuel keeps the fuel free from debris and prevents blockage of the fuel system further downstream.

When the temperature of the fuel from the fuel pump is sufficiently low, the water entrained in the fuel solidifies to form ice particles. The heat exchanger 12 cannot normally in extremely cold conditions provide sufficient heat to melt the ice particles entrained in the fuel which then pass to the fuel filter 14 and cause blockages. As the filter 14 becomes blocked with the ice particles the flow of fuel through the filter 14 is restricted and pressure builds up in the duct 16. When the pressure differential across the heat exchanger 12 and the filter 14 reaches a predetermined limit the pressure in the duct 16 is sufficient to open the relief valve 20 against the action of the opposing spring 19. The fuel then flows from the duct 16 through the relief valve 20 to the duct 22. The fuel bypasses the heat exchanger 12 and the filter 14 and rejoins the fuel system downstream of the filter 14.

A proportion of the fuel flows through the ducts 16 and 22 and the relief valve 20 interposed between them. The amount of fuel flowing through the bypass is limited by the restrictor 18 which is located in the duct 16 adjacent the relief valve 20. By allowing a proportion of the fuel to flow through the bypass a reduced flow of fuel passes through the heat exchanger 12 and the filter 14. This reduced flow is heated by the heat exchanger 12 to a temperature which is sufficiently high to melt the ice particles blocking the filter 14. The ice particles are quickly dispersed by the reduced flow of fuel which has been heated by the heat exchanger 12.

Once the ice particles have melted the filter 14 is unblocked allowing more fuel to flow therethrough. The back pressure in the duct 16 reduces, causing the relief valve 20 to close under the influence of the spring 19. The valve geometry is arranged such that closure of the relief valve 20 occurs at a lower pressure than that required to open the valve 20. This avoids the system stabilising with the valve 20 partially open and the filter blockage remaining constant. Closure of the relief valve 20 causes all the fuel to flow through the heat exchanger 12 and the filter 14 so that normal operation is restored.

Although the present invention has been described with reference to a fuel system of a gas turbine aeroengine it will be appreciated by one skilled in the art that the invention is applicable to any filtering system in which problems are envisaged due to the solidification of liquid impurities entrained within a fluid at low temperatures.

I claim:

1. A fluid filter assembly comprising
a fluid filter having an inlet and an outlet to permit a flow of fluid therethrough to filter any solid impurities entrained within the fluid,
heating means adjacent the inlet of the fluid filter to heat the fluid and any liquid impurities entrained therein prior to passing through the filter,
and bypass means for allowing a proportion of the fluid to bypass the heating means and the fluid filter, when a predetermined pressure differential exists across the heating means and fluid filter,
whereby in operation the bypass means for allowing a proportion of fluid to bypass the heating means and the fluid filter is normally closed so that all fluid flows through the heating means and the fluid filter, however when the fluid temperature is sufficiently low to cause blockage of fluid filter by solidification of the liquid impurities entrained therein, the bypass means is adapted to open to allow a proportion of fluid to bypass the heating means and the fluid filter when a predetermined pressure differential exists across the heating means and fluid filter, so that a reduced amount of fluid flows through the heating means, the magnitude of the reduction in the flow of fluid through the heating means being such that said fluid is heated to a temperature sufficiently high to melt any solidified impurities blocking the fluid filter.

2. A fluid filter assembly as claimed in claim 1 in which the bypass means for allowing a proportion of the fluid to bypass the heating means and the fluid filter is a duct incorporating a relief valve.

3. A fluid filter assembly as claimed in claim 2 in which the relief valve is pressure responsive.

4. A fluid filter assembly as claimed in claim 1 in which the heating means is a heat exchanger.

5. A method of melting solidified liquid impurities blocking a fluid filter in a fluid filter assembly which comprises a heating means and a fluid filter in series fluid flow relationship comprising the steps of,
opening a bypass means associated with said fluid filter assembly to allow a proportion of a fluid to bypass the heating means and the fluid filter so that a reduced amount of fluid flows through the heating means and fluid filter,
heating the reduced amount of fluid flowing through the heating means to a temperature sufficiently high to melt the solidified liquid impurities in the fluid filter, and closing the bypass means so all fluid flows through the heating means and the fluid filter once the solidified liquid impurities in the fluid filter have melted.

6. A fluid filter assembly comprising
a fluid filter having an inlet and an outlet to permit a flow of fluid therethrough to filter any solid impurities entrained within the fluid,
heating means adjacent the inlet of the fluid filter to heat the fluid and any liquid impurities entrained therein prior to passing through the filter,
and bypass means for allowing a proportion of the fluid to bypass the heating means and the fluid filter, when a predetermined pressure differential exists across and heating means and fluid filter,
whereby in operation the bypass means for allowing a proportion of fluid to bypass the heating means and the fluid filter is normally closed so that all fluid flows through the heating means and the fluid filter, however when the fluid temperature is sufficiently low to cause blockage of the fluid filter by solidification of the liquid impurities entrained therein, the bypass means is adapted to pen to allow a proportion of fluid by bypass the heating means and the fluid filter when a predetermined pressure differential exists across the heating means and the fluid filter, so that a reduced amount of fluid flows through the heating means, the magnitude of the reduction in the flow of fluid through the heating means being such that said fluid is heated to a temperature sufficiently high to melt any solidified impurities blocking the fluid filter, said bypass means for allowing a proportion of the fluid to bypass the heating means and the fluid filter comprising a duct incorporating a relief valve, said duct including a restrictor to limit the amount of fluid which can flow therethrough.

* * * * *